US005878862A

United States Patent [19]

Dewsnap

[11] Patent Number: 5,878,862

[45] Date of Patent: Mar. 9, 1999

[54] PRODUCT DELIVERY DEVICE

[75] Inventor: Paul D. Dewsnap, Huntington, N.Y.

[73] Assignees: Ledan, Inc., Mineola; D & D Marketing and Consulting, Inc., Huntington, both of N.Y.; a part interest

[21] Appl. No.: 990,726

[22] Filed: Dec. 15, 1997

[51] Int. Cl.[6] .................... B65G 11/00

[52] U.S. Cl. .................... 193/27; 221/150 R; 211/59.2

[58] Field of Search .................... 221/150 R; 211/59.2, 211/74, 162; 193/25 FT, 27, 28, 2 D

[56] References Cited

U.S. PATENT DOCUMENTS

| | | | |
|---|---|---|---|
| 2,311,449 | 2/1943 | Lilley | 221/150 R X |
| 2,880,904 | 4/1959 | Linthicum | 221/125 |
| 2,919,814 | 1/1960 | Berkowitz | 211/74 |
| 3,055,293 | 9/1962 | Lasiccia | 193/27 X |
| 3,231,110 | 1/1966 | Bossell et al. | 193/27 X |
| 3,286,846 | 11/1966 | Brandes | 211/59.2 |
| 3,318,455 | 5/1967 | Takahashi | 211/59.2 |
| 3,501,016 | 3/1970 | Eaton | 211/49 |
| 3,805,964 | 4/1974 | Titus, Jr. | 211/74 |
| 4,022,363 | 5/1977 | Eliassen | 211/74 |
| 4,401,221 | 8/1983 | Suttes | 211/74 |
| 4,917,264 | 4/1990 | Gasiel et al. | 193/27 X |
| 5,078,459 | 1/1992 | Sclater | 211/59.2 X |
| 5,209,358 | 5/1993 | Simard | 211/74 |
| 5,586,665 | 12/1996 | Brousseau | 211/59.2 |
| 5,586,687 | 12/1996 | Soamer et al. | 221/298 |
| 5,669,527 | 9/1997 | Hardy | 221/191 |

*Primary Examiner*—James R. Bidwell
*Attorney, Agent, or Firm*—Charles E. Temko

[57] ABSTRACT

An improved delivery track construction for use with known coolers and dispensing devices for bottled beverages. The construction includes a series of inclined tracks having first and second adjacent terminal ends, the tracks having a one-hundred eighty degree loop between the ends. The track permits the introduction of replacement stock at an upper end for feeding under gravity to a lower end, and assures that bottles are dispensed on a first in, first out basis.

2 Claims, 2 Drawing Sheets

PRODUCT DELIVERY DEVICE

BACKGROUND OF THE INVENTION

This invention relaters generally to the field of refrigerated coolers for serially dispensing packaged beverages, such as carbonated sodas, fruit juices, and the like. More particularly, it relates to an improved track arrangement for serially moving containers to a point of disengagement by a user.

The present state of the art is highly developed, and diverse attempts have been made to cope with the long-standing problems involved with such structures. Among the most prominent are those related to maximum utilization of available space within the cooler, trouble-free operation, and the need to provide for dispensing older stock in preference to newer stock. It is also desirable that inlet and outlet locations be substantially adjacent, to permit front loading where the cooler is installed against a vertical wall, as is commonly the case.

The need for dispensing on a first in, first out basis is recognized in U.S. Pat. No. 3,501,016 to Eaton, dated Mar. 17, 1970. This patent describes a U-shaped channel of relatively short length in which the containers are supported at a bottom surface, and the channel has no provision for gravity feeding of the containers.

U.S. Pat. No. 5,586,665 discloses a U-shaped storage channel for supporting necked bottles within a channel which engages the transfer ring on the neck of the bottle. The channel is supported at an angle for gravity feed. However, both rectilinear segments of the channel are angled in the same direction, so that both free ends serve as both a feeding inlet and a dispensing outlet. Thus, unless care is taken to consistently use only one of the ends for loading, old stock can accumulate in the area of the U-shaped segment of the channel.

SUMMARY OF THE INVENTION

Briefly stated, the invention contemplates the provision of an improved channel construction of U-shaped configuration in which the first and second rectilinear segments of the channel are in non-planar relation, so that one free end of the channel is positioned substantially above the other free end to permit loading of the channel at the upper end wherein each loaded bottle is conducted under gravity away from the upper end until the channel is completely filled to thus provide an indication to service personnel of such condition. Where multiple channels are arranged in stacked relation, maximum space utilization is also accomplished.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 1:
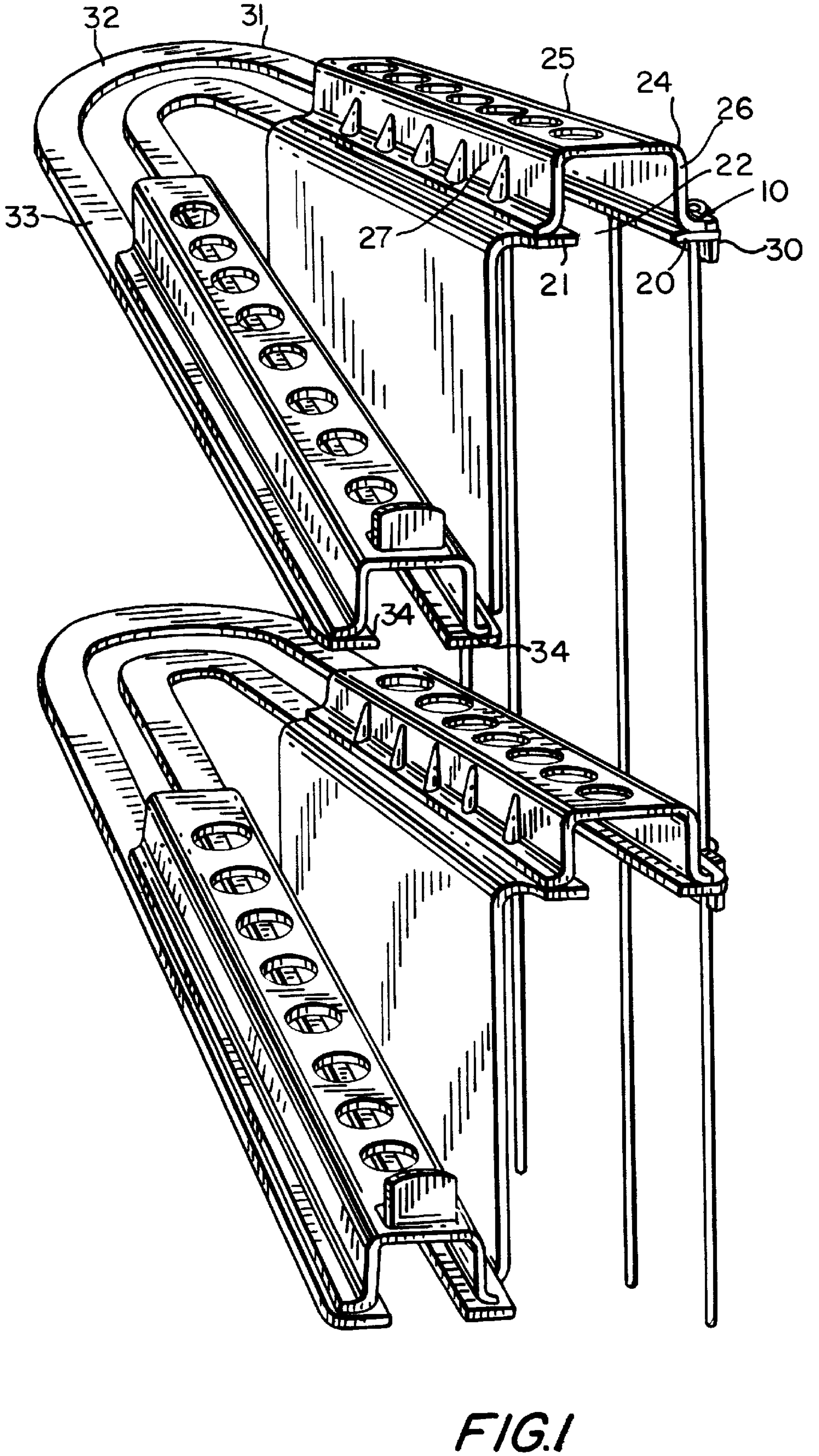
FIG. 1 is an exploded view in perspective of an embodiment of the invention, with certain of the component parts removed for purposes of clarity.

In accordance with the invention, the device, generally indicated by reference character 10, comprises first, second and third track elements 11, 12, and 13, respectively; and an interconnecting frame element 14.

The track elements 11–13 are substantially similar, and accordingly, a description of one of said elements will serve to describe all. Each element 11–13 includes first and second rails 20–21 in parallel relation forming an interstice 22 for reception of the necks of bottles 22 which are supported by a known transfer ring (not shown). The rails are interconnected by an upper wall element 24 including a top wall 25 and first and second side walls 26–27 which form a recess for the capped top of a bottle.

Figure 2:
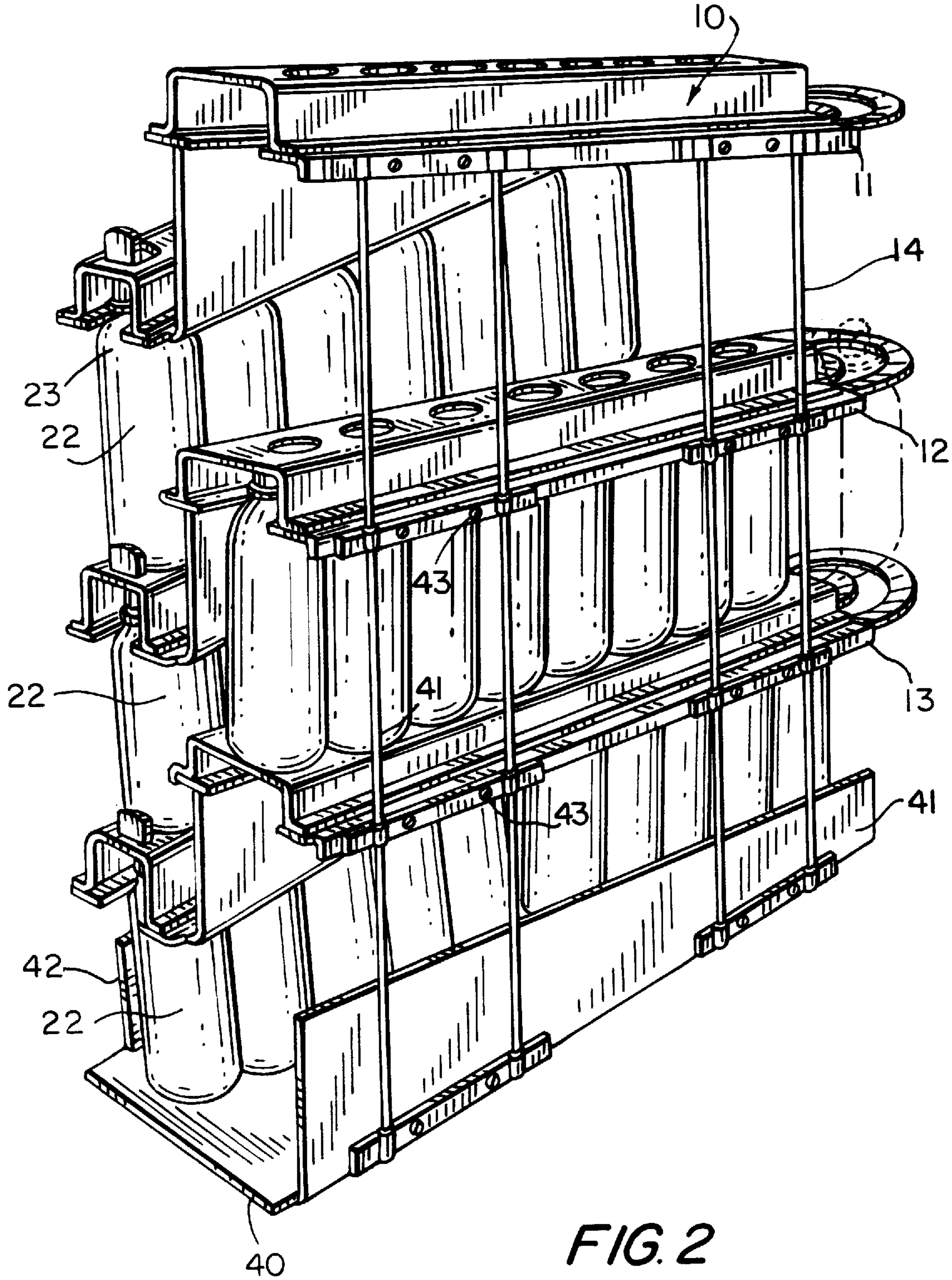
FIG. 2 is a perspective view thereof in fully assembled condition.

Each of the rails 20–21 commences at a first end 30 and includes a first rectilinear segment 31, a curved segment 32, and a second rectilinear segment 33 terminating at a second end 34. The segments 31 and 33 are inclined with respect to a horizontal plane at a common angle to provide continuous gravity feed from the first end 30 to the second end 34. Referring to FIG. 2, the track elements 11–13 are integrated in vertically stacked arrangement over a supporting base wall 40 by side supports 41 and 42 one each side being interconnected by screws or rivets at locations 43.

The above-described arrangement assures that the first end 30 will be employed for loading by service personnel for the reason that upon the insertion of each bottle, the bottle will be conducted by gravity away from the end until the entire track element is filled. It further assures that older stock will be dispensed first, since the bottles will move only in a single direction as they are serially dispensed.

It may thus be seen that I have invented novel and useful improvements in the field of bottle feeding, track structure used in known cooler devices. By using a U-shaped track in which the first and second rectilinear sections are disposed at a substantial relative angle, it is possible to provide continuous gravity feed in a single direction. Because the loading end of the track is disposed substantially above the dispensing end, bottles move in only a single direction under the action of gravity, and new stock may be introduced without resistance.

I wish it to be understood that I do not consider the invention to be limited to the precise details of structure shown and set forth in the specification, for obvious modifications will occur to those skilled in the art to which the invention pertains.

I claim:

1. In a gravity feed track for conveying bottles from a first loading end to a second dispensing end, said tracks comprising first and second parallel rails defining an interstice therebetween, said bottles having a neck portion including a transfer ring, said rails engaging said neck portion beneath said transfer ring, the improvement comprising: said track including first and second rectilinear sections, and a generally U-shaped section interconnecting said first and second rectilinear sections; said first rectilinear section including said loading end and being inclined at a first angle relative to a horizontal plane; said second rectilinear section including said dispensing end and being inclined at a second angle relative to said horizontal plane, such that said loading end is disposed at a level substantially higher than said dispensing end whereby loaded bottles are conducted by gravity away from said loading end.

2. The improvement in accordance with claim 1, further comprising multiple tracks in horizontally stacked relation such that said first and second sections are disposed in common vertical planes.

* * * * *